Patented Feb. 14, 1933

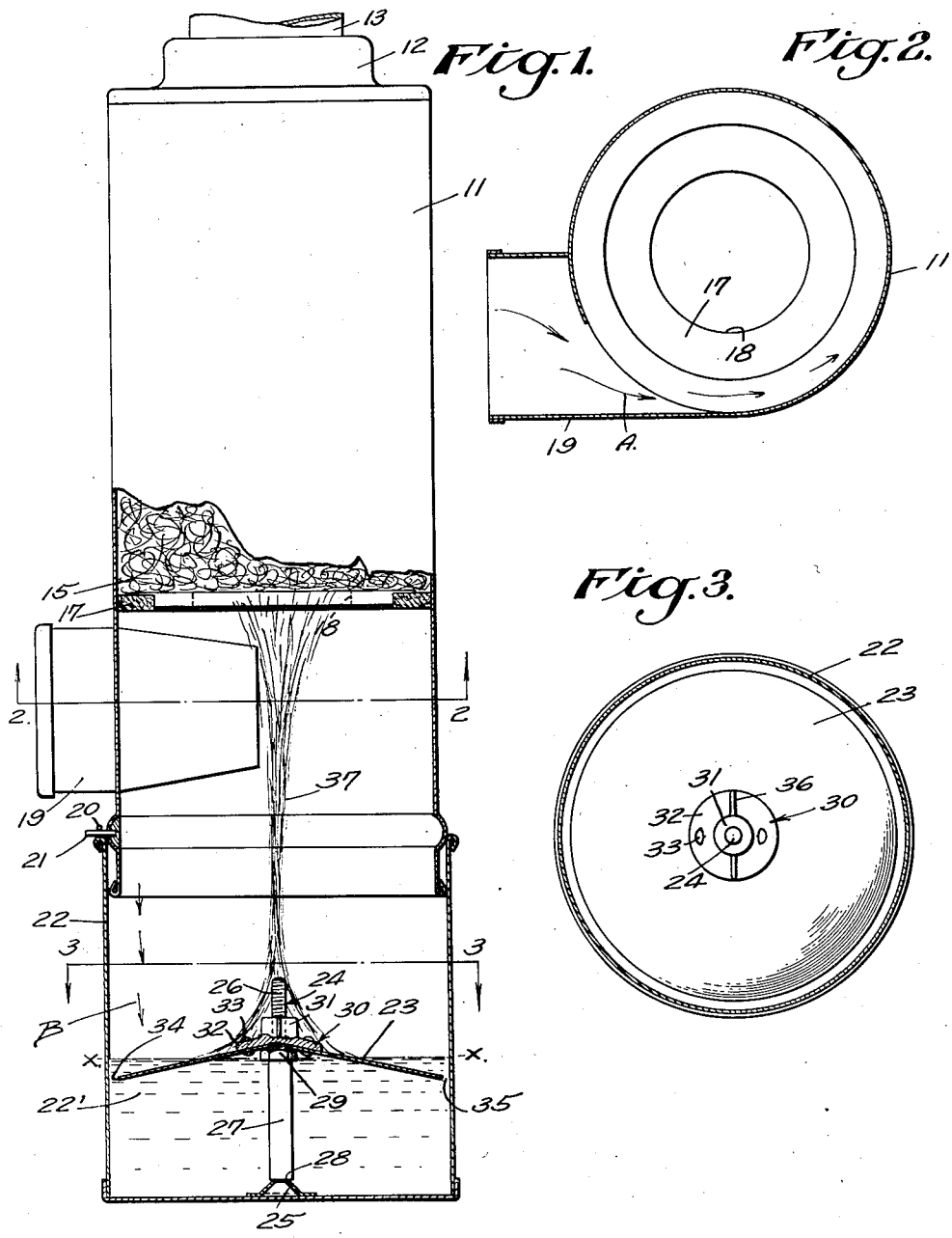

1,897,370

UNITED STATES PATENT OFFICE

HERMAN H. GARNER, OF CLAREMONT, CALIFORNIA, ASSIGNOR TO VORTOX MANUFACTURING COMPANY, OF CLAREMONT, CALIFORNIA, A CORPORATION OF CALIFORNIA

DEFLECTOR PLATE FOR AIR FILTERS

Application filed July 3, 1929. Serial No. 375,759.

My invention relates to an attachment for air cleaners which is applied to the intake of an internal combustion engine for the purpose of removing dust and dirt from the air before it enters the engine.

My invention is particularly applicable to tractors or to automobiles which operate under extremely dusty conditions.

In the wet type of air cleaner to which the invention pertains, there is a tendency of the engine suction to suck or draw up too much oil through the filter into the engine.

The principal object of my invention is to provide a means operative to control the amount of oil which can be sucked up by the cyclonic action of air regardless of the magnitude of the suction created by the engine to which the air cleaner is attached.

Under the influence of high vacuum it sometimes occurs that so much oil is sucked from the oil cup that it passes into the engine, and to remedy this condition, I have provided a deflector plate adapted to be located in the oil cup in such a manner that it projects partly above or slightly below the oil level and provides just enough oil for the spray action and keeps the filter material washed clean, and yet not enough so that the filter will be filled and force the oil over into the engine.

A further object of the invention is to provide means for controlling the amount of oil drawn by the atmospheric air into the filtering material of the air cleaner.

Further objects and advantages will be made evident hereinafter.

Referring to the drawing which is for illustrative purposes only,

Fig. 1 is an elevation, partly in cross section, through the air cleaner proper.

Fig. 2 is a section on a plane indicated by the line 2—2 of Fig. 1.

Fig. 3 is a section on a plane indicated by the line 3—3 of Fig. 1.

In the embodiment of my invention illustrated in the drawing, 11 is a cylindrical casing which is provided with a top 12 threaded to fit upon a pipe 13 which connects to the intake of the carburetor of an internal combustion engine. Inside the top of the casing 11 there is carried a body of filter material 15. An annular ring 17 fits tightly inside the casing 11 and supports the filter material 15, the ring 17 having a central opening 18. Situated directly below the ring 17 is an air inlet pipe 19 which is so situated with relation to the casing 11 that it admits the air tangentially into that casing. Secured on the bottom of the casing 11 by means of hooks 20 which engage pins 21 is a can 22. The can 22 is adapted to contain a body of oil 22', the level of which is indicated at X—X in Fig. 1, and need not make an absolutely air-tight joint with the casing 11.

The means operative to control the amount of oil which is to be applied to the body of filter material 15 and which forms the principal part of my invention comprises a deflector plate 23 of inverted conical configuration in cross section.

The deflector plate 23 is supported within the can 22 by a bolt 24 which is secured to the central part of the base of the can by welding the same to a bracket plate 25. The upper end of the bolt 24 is screw threaded at 26, and surrounding the major portion of said bolt 24 is a tube 27, the lower end of which rests upon the conical central portion 28 of the bracket plate 25. A nut 29 is adapted for threaded engagement upon the threaded end 26 of the bolt 24, and when adjusted in one direction thereon will seat upon the upper end of the tube 27. The deflector plate 23 has secured axially thereon a casting 30. The casting 30 is formed with an annular hub portion 31 which is interiorly threaded to receive the threaded end 26 of the bolt 24 and has an annular flange 32 provided with holes for the reception of rivets 33, by means of which the plate 23 is secured to the casting 30. The peripheral edge 34 of the plate 23 is spaced from the wall of the can 22 to provide an annular oil space 35. The annular flange 32 of the casting 30 is formed with projecting ridges forming operating handles 36 for the deflector plate 23. The deflector plate 23 is adjustable on the bolt 24 by means of the handles 36 so as to submerge the plate in the oil, and in the best operative position the plate will project partly above and partly below the oil level or slightly below the oil level.

The deflector plate 23 protects the oil below it from the action of the air so that it is not carried up, but leaves the oil above it exposed so that it may be carried upward.

The method of operation of the invention is as follows:

Before starting the engine, the can 22 is removed and oil is placed in the can up to the level indicated at X—X in Fig. 1. The can 22 is then replaced. Whenever the engine is started, it creates a vacuum inside the upper portion of the shell 11, this vacuum drawing air in violently through the inlet 19. The incoming air at atmospheric pressure carrying dust particles is caused by its direction of entrance to rotate inside the casing 11, forming a vortex 37. On entering the casing 11 the air stream tends to flatten out and spread along the walls of the casing and can 22, being prevented by the ring 17 from spreading upwardly. The entire air stream follows a spiral course downwardly carrying the dust particles with it. Due to the centrifugal force acting on the whirling mass of air and dust, the heavier dust particles are thrown outwardly against the said walls. The dust, of course, adheres to the oil on the walls and as this oil is constantly flowing down the walls and back into the cup, the dust is carried with it and settles to the bottom after passing through the space 35.

The suction of the engine pulls clean air from the center of the vortex upwardly through the opening 18 below the bottom of the filter material 15. The air is then drawn through the filter material and through the pipe 13 into the intake of the carburetor.

A portion of the oil 22' is sucked upwardly through the opening 18 into the interstices of the filter material 15. This upward movement of the oil 22' is due to the vortex, the pressure in the center of this vortex being considerably lower than at the edges. I have likewise found that the oil forms an elevated point near the center of the can 22, the oil around the periphery of the can being depressed. This elevated point is higher as the speed of the engine is increased, and if the engine is run at a very high speed or the diameter of the casing 11 is too small, the deflector plate or wall means 23 prevents the whole contents of the can 22 from being sucked up into the filter material 15. It is very desirable that at low speeds the drops of oil should be whipped up and thrown into the filter material and it is for this reason that some oil is provided above the deflector plate.

By introducing the plate 23 just below the surface of the oil body or partly below the surface of the oil, I am able to produce just enough oil for the spray action on the filter material and keep the filter material washed clean, but not enough oil is evacuated so that the filter will be filled and force oil into the engine. At the same time I provide ample space below the plate 23 for the dust which is caught. In actual service I have found that the dust works down over the edges of the plate, settling in the bottom of the cup.

It is obvious in this connection that the plate 23 may be either conical or flat and may be attached to the cup in various ways.

In practice I prefer to make the diameter of the cleaner such that considerable amounts of oil are constantly being drawn up into the filter material, keeping it wet and washing the dirt caught therein back into the can without making the diameter so small that there is an appreciable tendency for a total evacuation of oil to take place at high engine speeds.

The oil caught in the filter material runs through the opening 18 and falls back into the can 22, carrying the dirt from the filter material with it. This dirt settles in the can 22, forming a sediment which can be readily removed by detaching the can. In practice the oil is utilized as a washing agent for the filter material 15, this washing taking place whenever the engine as described above is run.

The air passing upwardly through the opening 18 is freed of all the heavier dust which is caught by the oil, but lighter particles are still carried by the air. The air passing through the opening 18 is still rotating violently, and the dust therein tends to stratify, the heavier of these particles being carried in the outer layers of the rotating column of air are caught in the filter material, the center of this column being practically free from dust particles.

I claim as my invention:

1. An air filter comprising: a casing adapted to contain a body of liquid; a filter in said casing above said body of liquid; means for producing an air vortex in said casing of sufficient strength to draw said liquid into said filter; and means for controlling the action of the air on said body of liquid in a manner to govern the amount of liquid to be carried by the air.

2. An air filter comprising: a casing; a cup adapted to hold a liquid material and closing the bottom of said casing; a removable air filter formed of a matted mass of wires and placed in said casing above said cup; means for introducing air tangentially into said casing between said filter and said cup to form a vortex to draw said liquid upwardly into said air filter; a deflector plate disposed in said cup; and means for adjusting said deflector plate to control the amount of liquid which can be drawn upwardly by the air.

3. An air filter comprising: a casing adapted to contain a filter material; a cup attached to said casing and adapted to contain a liquid; means for introducing air tangentially into said casing to form a vortex to draw liquid upwardly into said air filter; and a deflector plate disposed in said cup and adapted for adjustment to control the amount of liquid to be sucked up by the action of the air.

4. An air filter comprising: a casing adapted to contain a filter material; a cup attached to the open end of said casing and adapted to contain a body of liquid; means for introducing air tangentially into said casing between said body of liquid and said filter material; a deflector plate disposed in said can; and means for adjusting said plate to control the amount of liquid which can be sucked into said filter by the action of the air.

5. An air filter comprising: a casing adapted to contain a filter material; a cup attached to said casing and adapted to contain a body of liquid; an inlet member for introducing air tangentially into said casing between said liquid body and filter material; and a deflector plate disposed in said cup and adapted to be semi-submerged in said liquid body, said plate adapted for adjustment to control the amount of liquid which can be sucked up by the cyclonic action of the air into said filter.

6. An air filter comprising: a casing adapted to contain a filter material; a cup attached to said casing and adapted to contain a liquid body; means for introducing air into said casing to produce a vortex between said liquid body and said filter material; and a deflector plate disposed in said cup and providing an opening of such size and character as to control the action of the air on the body of oil in such manner that the amount of oil to be carried away by the air will be governed.

7. An air filter of the character described, including: a casing adapted to contain a body of liquid; dust catching means in said casing having surfaces adapted to be wet by liquid; means for producing a flow of air tending to carry liquid from said body into said dust catching means; a deflector member disposed in said casing in position proximate to the upper surface of said body of liquid; and means for adjusting said deflector member to control the amount of liquid which can be drawn upwardly by the air.

8. An air filter of the class described, including: a casing adapted to contain a body of liquid; dust catching means in said casing adapted to be wet by said liquid; means for producing a flow of air tending to carry said liquid into said dust catching means; and a plate in said liquid, said plate being adjustable to vary the proportion of said body of liquid carried into said dust catching means.

9. In an air filter of the class described the combination of: a casing adapted to contain a body of liquid in the lower part thereof; a filtering means in the upper part of said casing through which the air being treated is passed, said filtering means adapted to be wetted, there being a space in said casing between said filtering means and said liquid; means whereby air is passed into said space in such a manner that a vortex is formed, said vortex operating on the surface of said liquid to carry a portion upward into said filtering means to wet same; and means for controlling the amount of liquid which can be picked up by said vortex, said last named means operating without disturbing said vortex.

10. In an air filter of the class described the combination of: a casing adapted to contain a body of liquid in the lower part thereof; a filtering means in the upper part of said casing through which the air being treated is passed, said filtering means adapted to be wetted, there being a space in said casing between said filtering means and said liquid; means whereby air is passed into said space in such a manner that a vortex is formed, said vortex operating on the surface of said liquid to carry a portion upward into said filtering means to wet same; and a member partly submerged in said liquid for controlling the amount of liquid which can be picked up by said vortex, said member operating without disturbing said vortex.

11. In an air filter of the class described the combination of: a casing adapted to contain a body of liquid in the lower part thereof; a filtering means in the upper part of said casing through which the air being treated is passed, said filtering means adapted to be wetted, there being a space in said casing between said filtering means and said liquid; means whereby air is passed into said space in such a manner that a vortex is formed, said vortex operating on the surface of said liquid to carry a portion upward into said filtering means to wet same; and a conical member partly submerged in said liquid for controlling the amount of liquid which can be picked up by said vortex, said member operating without disturbing said vortex.

12. An air filter comprising: a casing adapted to contain a filtering means and a body of liquid; means for introducing air into said casing between said filter means and said liquid to form a vortex to draw said liquid upwardly into said filter means; and a conical deflector plate diverging downwardly and partially submerged in said liquid for limiting the quantity of said liquid contacted by air.

13. An air filter comprising: a casing adapted to contain a filtering means and a body of liquid; means for introducing air into said casing between said filter means and said liquid to form a vortex to draw said liquid upwardly into said filter means; and a downwardly diverging conical plate partially submerged in said liquid and adjustably connected to said casing for varying the quantity of said liquid drawn into said filter means.

In testimony whereof, I have hereunto set my hand at Los Angeles, California, this 28 day of June, 1929.

HERMAN H. GARNER.